(12) United States Patent  
Sarathy et al.

(10) Patent No.: US 12,195,692 B2
(45) Date of Patent: Jan. 14, 2025

(54) MULTIFUNCTIONAL LUBRICANT ADDITIVE AND SELECTION METHOD

(71) Applicants: KING ABDULLAH UNIVERSITY OF SCIENCE AND TECHNOLOGY, Thuwal (SA); SAUDI ARABIAN OIL COMPANY, Dhahran (SA)

(72) Inventors: Subram Mani Sarathy, Thuwal (SA); Nikos Hadjichristidis, Thuwal (SA); Viko Ladelta, Thuwal (SA); Tsu-Fang Hong, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 18/277,711

(22) PCT Filed: Mar. 14, 2022

(86) PCT No.: PCT/IB2022/052276
§ 371 (c)(1),
(2) Date: Aug. 17, 2023

(87) PCT Pub. No.: WO2022/195452
PCT Pub. Date: Sep. 22, 2022

(65) Prior Publication Data
US 2024/0132798 A1 Apr. 25, 2024
US 2024/0228903 A9 Jul. 11, 2024

Related U.S. Application Data

(60) Provisional application No. 63/161,087, filed on Mar. 15, 2021.

(51) Int. Cl.
*C10M 145/34* (2006.01)
*C10N 30/00* (2006.01)
(Continued)

(52) U.S. Cl.
CPC .... *C10M 145/34* (2013.01); *C10M 2209/105* (2013.01); *C10M 2209/106* (2013.01);
(Continued)

(58) Field of Classification Search
CPC .......... C10M 145/34; C10M 2209/105; C10M 2209/106; C10M 2209/107; C10N 2030/70; C10N 2040/25; C10N 2070/00
(Continued)

(56) References Cited

U.S. PATENT DOCUMENTS 4,302,349 A * 11/1981 Kosswig ................. C07C 41/03
568/624
4,793,939 A * 12/1988 Mori ..................... C10M 169/04
508/579
(Continued)

FOREIGN PATENT DOCUMENTS

EP         0755978 A2    1/1997
WO    2009134638 A2    11/2009

OTHER PUBLICATIONS

Chen, Y., et al., "High Efficiency Organic Lewis Pair Catalyst for Ring-Opening Polymerization of Epoxides with Chemoselectivity," Macromolecules, Oct. 12, 2018, vol. 51, No. 20, pp. 8286-8297, ACS Publications.
(Continued)

*Primary Examiner* — Ellen M McAvoy
(74) *Attorney, Agent, or Firm* — PATENT PORTFOLIO BUILDERS PLLC

(57) ABSTRACT

A blend for lubricating a surface includes a lubricant and a polyepoxide terpolymer additive mixed with the lubricant. The polyepoxide terpolymer additive includes a first block having a group R1, a second block having a group R2, and
(Continued)

a third block having a group R3. Group R1 includes $C_4H_9$ or $C_6H_{13}$, group R2 includes $CH_3$, and group R3 includes $C_6H_5$.

20 Claims, 17 Drawing Sheets

(51) Int. Cl.
  *C10N 40/25* (2006.01)
  *C10N 70/00* (2006.01)

(52) U.S. Cl.
  CPC ... *C10M 2209/107* (2013.01); *C10N 2030/70* (2020.05); *C10N 2040/25* (2013.01); *C10N 2070/00* (2013.01)

(58) Field of Classification Search
  USPC .......................................................... 508/579
  See application file for complete search history.

(56) References Cited

U.S. PATENT DOCUMENTS

| | | | |
|---|---|---|---|
| 5,494,595 A | 2/1996 | Nieh | |
| 6,133,211 A * | 10/2000 | Cobianco | C08G 65/26 568/624 |
| 6,362,140 B1 * | 3/2002 | McGraw | C08G 18/4837 508/579 |
| 2010/0004151 A1 * | 1/2010 | Bush | C10M 107/34 508/567 |
| 2010/0267844 A1 * | 10/2010 | Varineau | C07C 41/03 162/158 |
| 2014/0142011 A1 * | 5/2014 | DeSantis | C10M 133/06 508/304 |
| 2015/0315513 A1 * | 11/2015 | Zhu | B28D 5/0076 508/579 |

OTHER PUBLICATIONS

Greaves, M., et al., "Performance Properties of Oil-Soluble Synthetic Polyalkylene Glycols," Lubrication Science, Jan. 29, 2012, vol. 24, No. 6, pp. 251-262, John Wiley & Sons, Ltd.

Herzberger, J., et al., "Polymerization of Ethylene Oxide, Propylene Oxide, and Other Alkylene Oxides: Synthesis, Novel Polymer Architectures, and Bioconjugation," Chemical Reviews, Dec. 29, 2016, No. 116, pp. 2170-2243, ACS Publications.

Hu, S., et al., "Macromolecular Architectures through Organocatalysis," Progress in Polymer Science, Jul. 15, 2017, vol. 74, pp. 34-77, Elsevier B.V.

International Search Report in corresponding/related International Application No. PCT/IB2022/052276, date of mailing Aug. 8, 2022.

Kiesewetter, M.K., et al., "Organocatalysis: Opportunities and Challenges for Polymer Synthesis," Macromolecules, Feb. 16, 2010, vol. 43, pp. 2093-2107, ACS Publications.

Qin, G., et al., "Mechanism of Resilin Elasticity," Nature Communications, Aug. 14, 2012, vol. 3, No. 1, pp. 1-9, Macmillan Publishers Limited.

Written Opinion of the International Searching Authority in corresponding/related International Application No. PCT/IB2022/052276, date of mailing Aug. 8, 2022.

Communication under Rule 164(2)(a) EPC, in corresponding/related EP Application No. 22711640.7, dated Jul. 18, 2024.

Communication pursuant to Rule 164(2)(b) and Article 94(3) EPC, in corresponding/related European Patent Application No. 22711640.7, dated Oct. 29, 2024.

* cited by examiner

TABLE 1

| run | Polymer 216 | [M1]/[M2]/[I1]₀/[IP₂]/TEB | time (h) | conv[b] (%) | $M_{n,NMR}$[c] (kg mol⁻¹) | Đ$_M$[d] |
|---|---|---|---|---|---|---|
| 1 | 11k PHO | 100:1:0.6:0.3 | 24 | 100 | 11 | 1.04 |
| 2 | 17k PHO-b-PPO | 100:120:1:0.6:0.3 | 22 | 88 | 17 | 1.08 |
| 3 | 12k POO | 100:1:0.6:0.3 | 24 | 100 | 12 | 1.04 |
| 4 | 18k POO-b-PPO | 100:120:1:0.6:0.3 | 22 | 90 | 18 | 1.06 |
| 5 | 22k POO-b-PPO-b-PSO | 100:120:35:1:0.6:0.3 | 24 | 93 | 22 | 1.12 |

FIG. 4

TABLE 2

| Lubricants | Kinematic viscosity at 40 °C (mm²/s) | Kinematic viscosity at 100 °C (mm²/s) | Viscosity index |
|---|---|---|---|
| AP230 | 40.2 | 6.3 | 104 |
| Blended with 2.5 wt% polymers | | | |
| 11k PHO | 46.6 | 7.1 | 111 |
| 17k PHO-b-PPO | 48.4 | 7.5 | 119 |
| 12k POO | 55.8 | 9.5 | 154 |
| 18k POO-b-PPO | 59.3 | 10.1 | 158 |
| 22k POO-b-PPO-b-PSO | 42.3 | 6.2 | 90 |
| Blended with 5.0 wt% polymers | | | |
| 11k PHO | 49.4 | 7.6 | 117 |
| 17k PHO-b-PPO | 51.3 | 7.9 | 121 |
| 12k POO | 58.7 | 10.2 | 163 |
| 18k POO-b-PPO | 64.1 | 10.9 | 162 |
| 22k POO-b-PPO-b-PSO | 45.8 | 6.7 | 98 |

FIG. 5

TABLE 3

| Additives | Neat (°C) | | 2.5 wt% blending (°C) | | 5.0 wt% blending (°C) | |
|---|---|---|---|---|---|---|
| | $T_{d5\%}$ | $T_{d50\%}$ | $T_{d5\%}$ | $T_{d50\%}$ | $T_{d5\%}$ | $T_{d50\%}$ |
| Pure base oil | 249 | 312 | - | - | - | - |
| 11k PHO | 248 | 371 | 300 | 380 | 308 | 387 |
| 17k PHO-b-PPO | 267 | 369 | 309 | 390 | 312 | 389 |
| 12k POO | 252 | 370 | 297 | 381 | 307 | 385 |
| 18k POO-b-PPO | 258 | 368 | 310 | 391 | 314 | 392 |
| 22k POO-b-PPO-b-PSO | 299 | 372 | 311 | 392 | 318 | 393 |

FIG. 6

TABLE 4

| Additives | 2.5 wt% blending (°C) | | | | 5.0 wt% blending (°C) | | | |
|---|---|---|---|---|---|---|---|---|
| | $T^*_{d5\%}$ | $\Delta T_{5\%}$ | $T^*_{d50\%}$ | $\Delta T_{50\%}$ | $T^*_{d5\%}$ | $\Delta T_{5\%}$ | $T^*_{d50\%}$ | $\Delta T_{50\%}$ |
| 11k PHO | 249.0 | 51.0 | 313.5 | 66.5 | 249.0 | 59.1 | 315.0 | 72.1 |
| 17k PHO-b-PPO | 249.5 | 59.6 | 313.4 | 76.6 | 249.9 | 62.1 | 314.9 | 74.2 |
| 12k POO | 249.1 | 47.9 | 313.5 | 67.6 | 249.2 | 57.9 | 314.9 | 70.1 |
| 18k POO-b-PPO | 249.2 | 60.8 | 313.4 | 77.6 | 249.5 | 64.6 | 314.8 | 77.2 |
| 22k POO-b-PPO-b-PSO | 249.3 | 61.8 | 313.5 | 78.5 | 249.5 | 68.5 | 315.0 | 78.0 |

FIG. 7

TABLE 5

| Blended oils | Avg. COF (a.u.) | Ball wear volume (mm²) | Avg. ECR (mΩ) |
|---|---|---|---|
| AP230 | 0.256 | 709.3 | 19 |
| Blended with 2.5 wt% polymers | | | |
| 11k PHO | 0.210 | 526.4 | 55 |
| 17k PHO-b-PPO | 0.148 | 346.4 | 103 |
| 12k POO | 0.232 | 312.2 | 90 |
| 18k POO-b-PPO | 0.145 | 102.3 | 520 |
| 20k POO-b-PPO-b-PSO | 0.180 | 128.9 | 112 |
| Blended with 5.0 wt% polymers | | | |
| 11k PHO | 0.208 | 490.7 | 88 |
| 17k PHO-b-PPO | 0.140 | 96.0 | 536 |
| 12k POO | 0.188 | 271.6 | 87 |
| 18k POO-b-PPO | 0.138 | 100.8 | 622 |
| 20k POO-b-PPO-b-PSO | 0.139 | 188.5 | 321 |

FIG. 8

MULTIFUNCTIONAL LUBRICANT ADDITIVE AND SELECTION METHOD

CROSS-REFERENCE TO RELATED APPLICATIONS

This application is a U.S. National Stage Application of International Application No. PCT/IB2022/052276, filed on Mar. 14, 2022, which claims priority to U.S. Provisional Patent Application No. 63/161,087, filed on Mar. 15, 2021, entitled "MULTIFUNCTIONAL LUBRICANT ADDITIVE AND PREPARATION METHOD," the disclosures of which are incorporated herein by reference in their entirety.

BACKGROUND

Technical Field

Embodiments of the subject matter disclosed herein generally relate to multifunctional lubricant additives and methods for selecting and/or forming them, and more particularly, to designing and making a multifunctional lubricant additive that shows good oil solubility and enhanced lubrication performance.

Discussion of the Background

Lubricants are widely present in natural and human-made moving parts. They play key roles in mitigating parasitic frictional energy losses, improving momentum transfer efficiency, and increasing mechanics operational lifetime. The existing commercially available lubricants contain multiple additives, such as friction modifiers, anti-wear agents, viscosity improvers, pour point depressants, antioxidants, dispersants, and detergents. Their complex chemical interactions make formulating effective lubricants particularly challenging. The automotive industry thereby prefers to blend multifunctional lubricant additives with the oil used in the combustion engines. For example, zinc dialkyldithiodiphosphates (ZDDPs) are well known to reduce friction and wear on sliding surfaces and simultaneously to enhance oxidation stabilities of lubricating oils when being operated in combustion engines. Nevertheless, consuming ZDDPs in internal combustion (IC) engines produce corrosive sludge, degrade the automotive exhaust after treatment systems, and emit harmful SOX emissions. The increasingly stringent environmental regulations pressures the automotive industry to replace the ZDDPs with other additives.

Multifunctional polymeric additives may suit the replacement of ZDDPs. This is so because utilizing polymeric materials entails a vast body of molecular designs and combinations of many functionalities. For instance, poly (alkyl methacrylates) (PAMAs) have been recognized for their multifunctional roles in reducing friction, enhancing material wear-resistive properties, and improving rheological properties of the lubricating oils. However, the PAMAs may degrade fast in extreme environments, i.e., high-temperature-and-high-stress IC engine reciprocations, producing unwanted polymers and viscous frictional species that degrade the fuel economy. Thereby, extensive research works have been undergone to improve PAMAs thermal and shear-stability. The industry and academia also explored PAMAs molecular designs with different monomers, nanomaterials, polymer topologies, and chemical functional groups. Nevertheless, there is limited exploration of other polymeric materials that serve multifunctionality as lubricant additives.

Polyepoxides have been widely applied in many industries, including pharmaceuticals, packaging, antifoaming agents, and softeners industries [1]. Because of their versatility, minimal environmental impacts, and economic scalability, they were recently considered for lubricating oil applications [2, 3]. For instance, poly(propylene oxide), also known as poly(propylene glycol), can be easily formulated as a commercial lubricant [2]. These oxides can also be utilized as the base oil to be mixed with other additives and enhance other oil lubrication performances. Poly(propylene oxides)-derived copolymers are currently studied as multifunctional lubricant additives [3]. They can enhance surface deposit controls, thicken lubricating oils, and improve boundary lubrication performances.

However, the existing lubricant additives based on these oxides do not easily mix with the oil used in the various applications, and thus, they are not very efficient. In addition, the presently used reactions for manufacturing these lubricant additives involve metal-based or organometallic catalysts [2], which results in catalyst residues, which are difficult to be removed. These metal catalyst residues affect the properties of the lubricant additives and degrade the overall performance of the lubricant.

Thus, in addition to the need for other multifunctional lubricant additives, there is also a need for a new method for making lubricant additives that do not include metal catalyst residues, enhance the oil solubility, and improve lubrication performance.

BRIEF SUMMARY OF THE INVENTION

According to an embodiment, there is a blend for lubricating a surface, and the blend includes a lubricant and a polyepoxide co(ter)polymer additive mixed with the lubricant. The polyepoxide co(ter)polymer additive includes a first block having a monomer $M_1$ and a second block having a monomer $M_2$. The first monomer $M_1$ includes hexene oxide, HO, or octene oxide, OO, and the second monomer $M_2$ includes propylene oxide, PO.

According to another embodiment, there is a polyepoxide co(ter)polymer additive for a lubricant, the polyepoxide co(ter)polymer additive including a first monomer $M_1$ that includes hexene oxide, HO, or octene oxide, OO, or lauryl glycidyl ether, LGE, or 2-ethylhexyl glycidyl ether, EHGE, a second monomer $M_2$ that includes propylene oxide, PO, and a third monomer $M_3$ that includes styrene oxide, SO.

According to yet another embodiment, there is a method for making a blend for lubricating a surface. The method includes providing a lubricant, selecting a first monomer $M_1$ to have aliphatic side chains, which simultaneously increases a solubility of a polyepoxide co(ter)polymer additive in the lubricant and a viscosity of the lubricant, selecting a second monomer $M_2$ to promote formation of a condensed polymeric film to reduce metallic contacts of rubbing surfaces between two metal surfaces, selecting a third monomer $M_3$ to increase a thermal stability of the lubricant, making the polyepoxide co(ter)polymer additive based on the first to third monomers ($M_1$ to $M_3$) by applying an organocatalytic ring-opening polymerization, ROP, process, and mixing the polyepoxide co(ter)polymer additive with the lubricant to obtain the blend. The polyepoxide co(ter)polymer additive is 5% or less by mass and the lubricant is the remaining balance of the blend.

BRIEF DESCRIPTION OF THE DRAWINGS

For a more complete understanding of the present invention, reference is now made to the following descriptions taken in conjunction with the accompanying drawings, in which:

FIG. 4 illustrates the various polyepoxide co- or terpolymer additives initiated from eicosanol and catalyzed by t-BuP$_2$/TEB catalysts at room temperature;

FIG. 5 illustrates the rheological properties of polyepoxide co- or terpolymer additive blended oils;

FIG. 6 illustrates the degradation temperatures of a motor oil, homo-, di-, and triblock polyepoxide co- or terpolymer additive blended oils containing 2.5 and 5% by weight additives;

FIG. 7 illustrates the calculated temperatures and deviations observed during the thermal degradation of blended lubricants;

FIG. 8 illustrates the tribological parameters measured on different oil-lubricated surfaces;

FIGS. 9A and 9B show the coefficient of friction and electrical contact resistance values, respectively, for a novel lubricant additive, for a programmed load from 50 to 500 N and a surface temperature maintained at 50° C., while

DETAILED DESCRIPTION OF THE INVENTION

Figure 1:
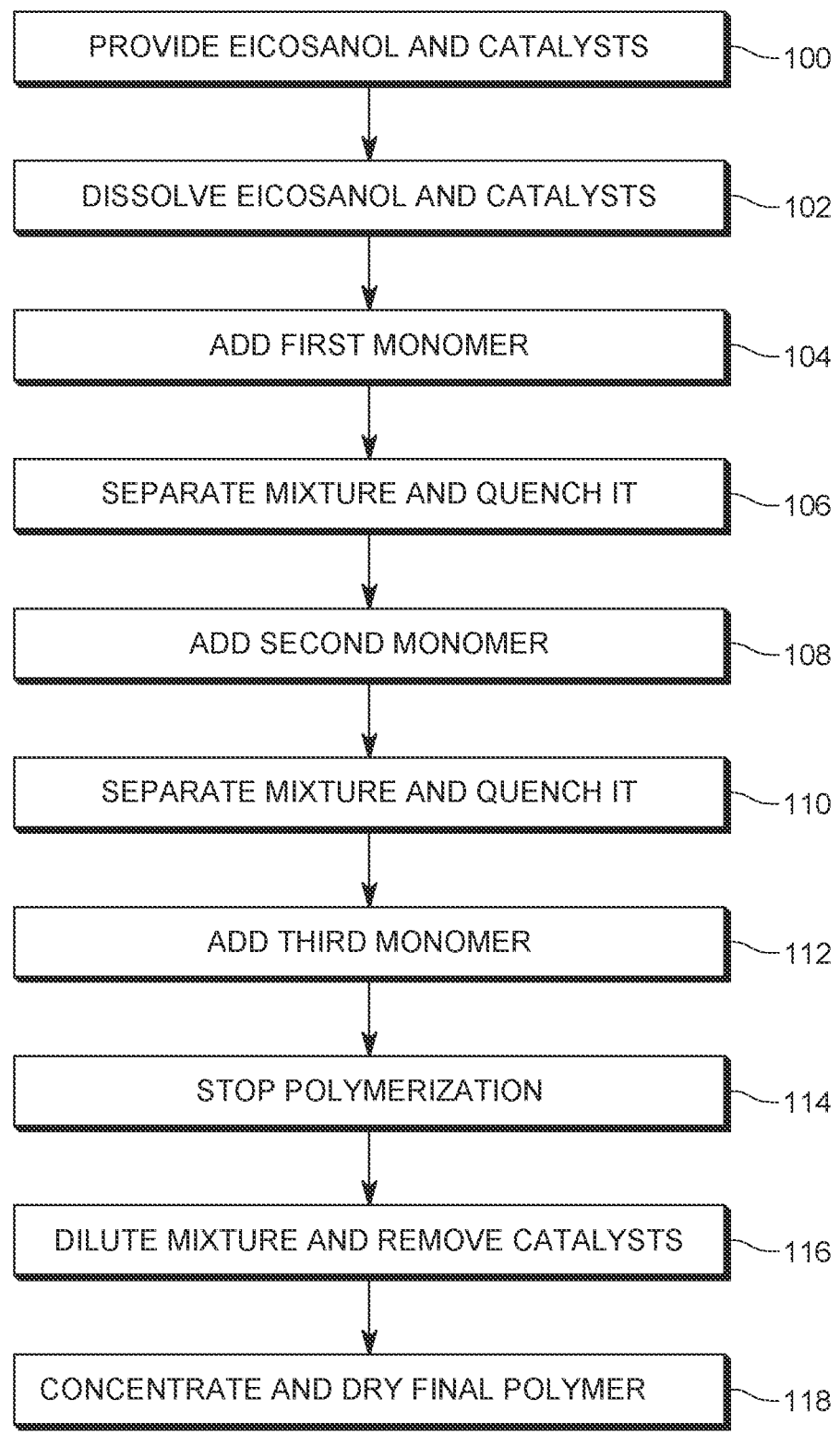
FIG. 1 is a flow chart of a method for making a polyepoxide copolymer or terpolymer-based lubricant additive.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to diblock- and triblock co- or terpolymers that are selected for achieving enhanced oil solubility and improved lubrication performance. A method that allows one to build such multifunctional lubricant additives is also discussed and this method avoids the metal residue that the currently used methods introduce. However, the embodiments to be discussed next are not limited to diblock- and triblock co- or terpolymers, but they may be applied to other polymers.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a multifunctional lubricant additive, e.g., polyepoxide co- or terpolymer additive, is designed to include at least a first block comprising monomer $M_1$ that includes hexene oxide, HO, or octene oxide, OO, or lauryl glycidyl ether, LGE, or 2-ethylhexyl glycidyl ether, EHGE. The multifunctional lubricant additive further includes a second block comprising monomer $M_2$, which may be based on propylene oxide, PO. The multifunctional lubricant additive may further include a third block comprising $M_3$, which has styrene oxide, SO. The multifunctional lubricant additive includes at least two of these blocks. In this application, a block copolymer is a copolymer formed when the two different homopolymers are covalently linked together and form 'blocks' of repeating units. For example, a polymer can be made up of X and Y monomers joined together like: -Y-Y-Y-Y-Y-Y-Y-Y-X-X-X-X-X-X-X-X-X-, which is a block copolymer where -Y-Y-Y-Y-Y-Y-Y-Y and -X-X-X-X-X-X-X-X-X- groups are the individual blocks. A smallest block can include several monomers.

The ring-opening polymerization (ROP) is the synthesis method mostly used toward well-defined polyepoxides co- or terpolymers [1]. Preparing polyepoxides often involve metal-based or organometallic catalysts [2]. As discussed above, the remaining catalyst residues, which are difficult to be removed, could negatively affect the properties of the lubricant additives. Such issues have triggered rapid developments of an organocatalytic ROP method [4-6]. One of the most promising organic catalysts is the Lewis pair of triethyl borane (TEB) and phosphazene base t-BuP$_2$. This catalyst/activator combination promotes the living/controlled ROP of epoxides with high efficiency, good selectivity, and narrow polydispersity. The organocatalytic ROP with TEB/t-BuP$_2$ catalysts paves the way to fabricate well-defined, catalyst residue-free polyepoxide co- or terpolymers, and at the same time, gives the possibility of tailor-designing polyepoxide co- or terpolymers with a variety of molecular features. Given these features, the inventors have synthesized metal residue-free, functionalized polyepoxide co- or terpolymers via ROP catalyzed by TEB/t-BuP$_2$ to be used as lubricant additives.

More specifically, to achieve high-performance multifunctional lubricant additives, three parameters need to be controlled: (a) thermal stability, (b) rheological properties, and (c) boundary lubrication performance (antifriction/wear properties). The inventors were able to design/synthesize polyether-based di- and triblock co(ter)polymers to fulfill these requirements. According to one embodiment, a first block contains polyethers with aliphatic side chains (hexene oxide (HO) or octene oxide (OO)), which can simultaneously improve the solubility of the additive in oil and the viscosity of the oils. Thus, this block solves the problem faced by the existing lubricant additives, which do not mix well with the oil. A second block is selected to be the poly(propylene oxide) PPO, which promotes the formation of the condensed polymeric film and thus, reduces the metallic contacts of rubbing surfaces. A third block is selected to include the styrene oxide SO monomer, which is expected to improve the thermal stability of the lubricants. The motivation for achieving thermal stability is to meet the needs of advanced downsized turbocharged spark-ignition engines operated at more extreme conditions (i.e., higher loads and temperatures).

In this or another embodiment, the inventors have further targeted polyether block co(ter)polymers with a molecular weight less than 100 kg mol$^{-1}$ as they sustain stronger resistivity to mechanical cleavage (i.e., greater shear stabilities). This also allows to achieve boundary lubrication performance with minimal corrosive wear effects caused by frictional species of degraded polymers.

Figure 2:
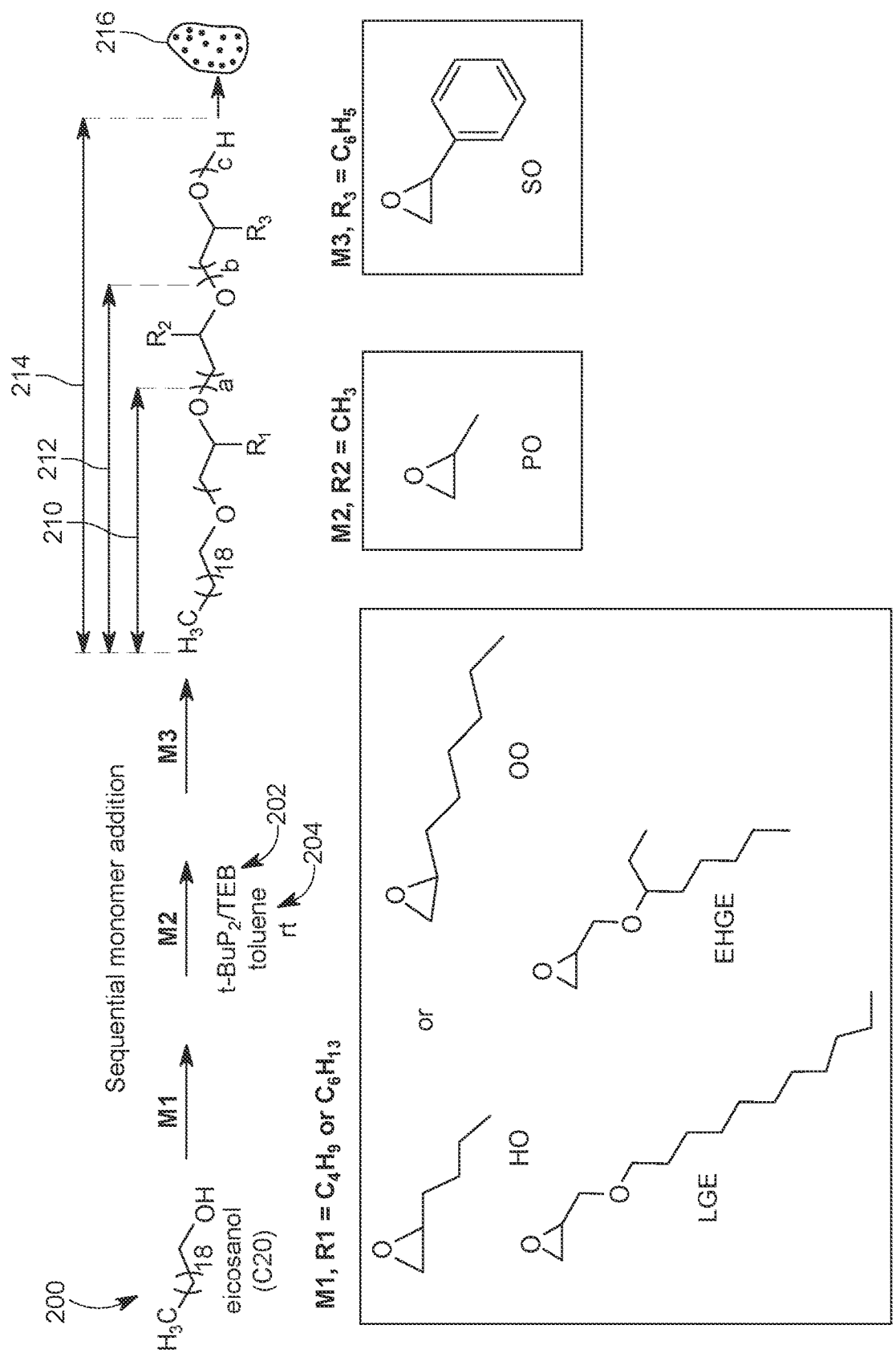
FIG. 2 schematically illustrates an organocatalytic ring-opening polymerization process used to make the polyepoxide co- or terpolymer additive.

A method for forming lubricated additives with the characteristics discussed above is now presented with regard to FIGS. 1 and 2. In a glove box (Ar atmosphere), a dry polymerization flask equipped with a stirrer bar was charged in step 100 (see flow chart of the method illustrated in FIG. 1) with 100 mg (0.168 mmol) of dry eicosanol 200 (i.e., aliphatic alcohol, $C_{20}H_{42}O$, as shown in FIG. 2), which is a novel initiator of the lubricant additive. In addition, 16.8 μL (3.36 μmol) of t-BuP$_2$, and 134 μL (0.134 mmol) TEB, which are the catalysts 202, and 1 mL dry toluene 204, are added to the flask. The mixture 200/202/204 was stirred in step 102 until all the eicosanol 200 completely dissolved at room temperature. A first monomer $M_1$, for example, OO (2 mL, 16.8 mmol) was added in step 104 to the blend, and the polymerization was performed at room temperature inside the glove box to obtain the first polymerization blend 210. The first monomer $M_1$ may also be one of hexene oxide HO, lauryl glycidyl ether, LGE, or 2-ethylhexyl glycidyl ether, EHGE (the structures of these monomers are shown in FIG. 2). In one application, any cyclic ether with alkyl side groups, e.g., hexyl, heptyl, octyl, etc., linear or branched, may be used as the first monomer $M_1$. The ROP was monitored by $^1$H NMR spectroscopy. After 24 h, the conversion of the 00 was nearly 100%. In step 106, 1 mL of the polymerization mixture 210 was withdrawn and quenched by benzoic acid solution in THF. In step 108, 2 mL of the second monomer $M_2$, e.g., PO, was added to the remaining polymerization mixture 210 to synthesize the diblock copolymer 212. In step 110, 1 mL of the polymerization mixture 212 was withdrawn and quenched. In step 112, 2 mL of a third monomer $M_3$, e.g., SO, was added to the living diblock copolymer 212 to form the third block and obtain the final triblock polymer (terpolymer) 214. After more than 20 h, the polymerization was stopped by the addition of benzoic acid solution in step 114. Three drops of the aliquots were withdrawn to determine the conversion of the second monomer by NMR. The rest of the polymerization mixture was diluted in step 116 in 5 mL dichloromethane (DCM), mixed, and stirred with neutral alumina powder for 1 h to remove the catalyst residue. The final multifunctional co(ter)polymer 216 was concentrated in step 118, under reduced pressure and dry in vacuum at 40° C. for 24 h. Note that the first monomer $M_1$ includes a group $R_1$, which may be $C_4H_9$ or $C_6H_{13}$ or $C_{11}H_{25}O$ or $C_6H_{18}O$, the second monomer $M_2$ includes a group $R_2$, which may be $CH_3$, and the third monomer $M_3$ includes a group $R_3$, which may be $C_6H_5$. While FIG. 2 shows block copolymers and terpolymers, random copolymers and terpolymers having the same chemical compositions may also be formed and used as lubricant additives. Note that a copolymer is understood herein to be a polymer made of two different monomers while the terpolymer is understood herein to be a polymer made of three different monomers. The method discussed above can be used to form either type of polymer.

Figure 3A:
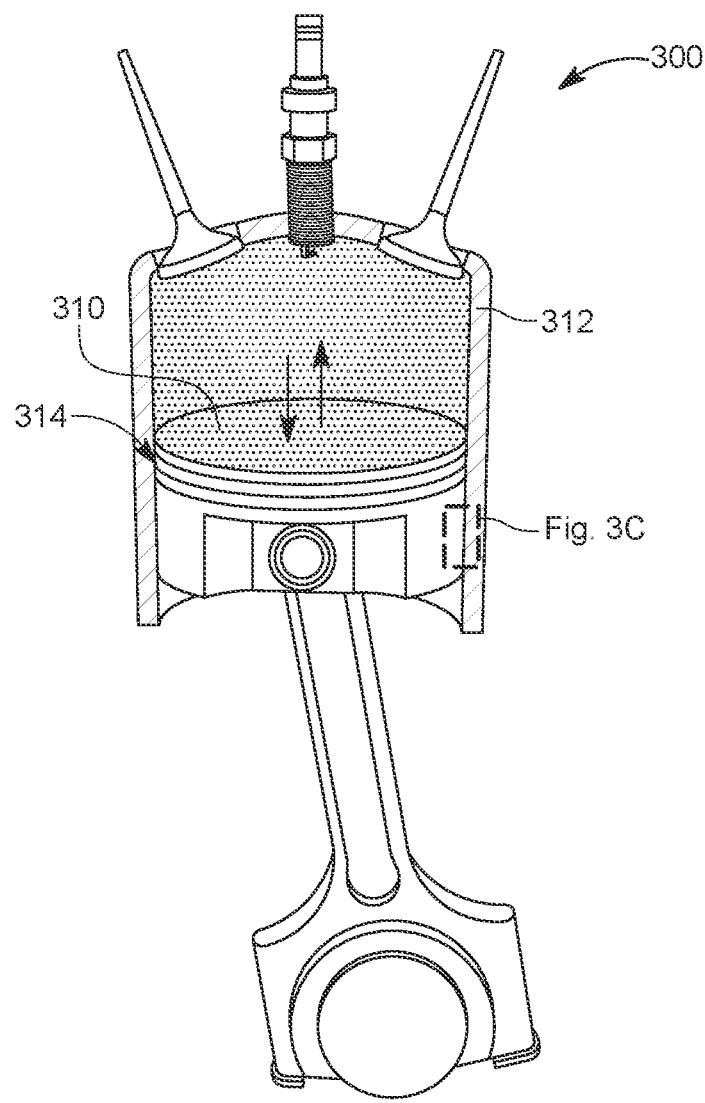
FIG. 3A illustrates a piston moving inside a cylinder and the presence of a lubricant film between the two.
Figure 3B:
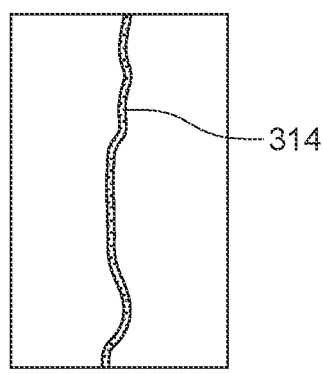
FIG. 3B illustrates the damage in the surfaces of the piston and cylinder when using a traditional lubricant.
Figure 3C:
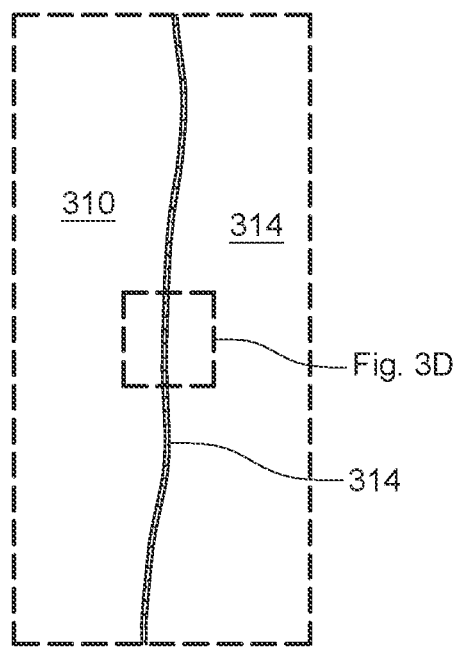
FIG. 3C illustrates the less damaged surfaces when using a novel polyepoxide co- or terpolymer additive.
Figure 3D:
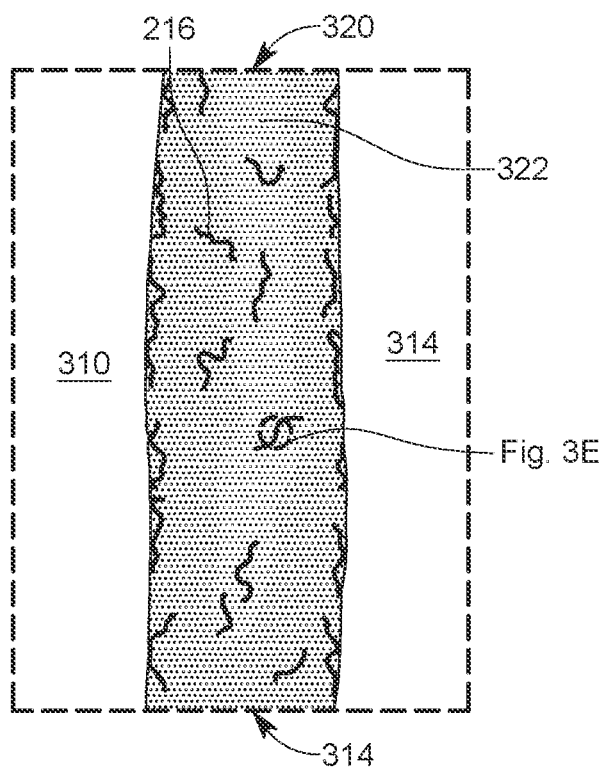
FIG. 3D shows in more detail the polyepoxide co- or terpolymer additive within the lubricant, and FIG. 3E identifies the various monomers of a polyepoxide terpolymer additive.
Figure 3E:
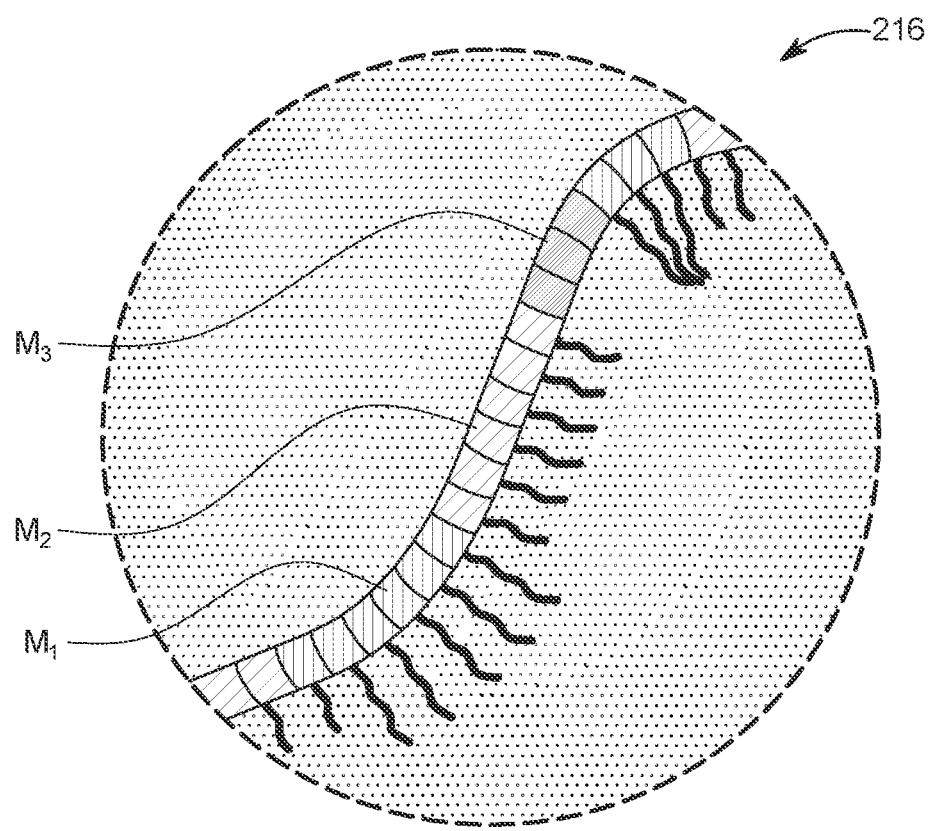

The novel lubricant additives discussed above can be configured/designed/selected to achieve any combination of thermal stability, friction reduction, and viscosity improvement by selecting the appropriate combination of monomers. For example, FIGS. 3A to 3C show a possible use of such designed lubricant additive within the context of an IC engine 300. Essentially, a piston 310 moves in a typical up and down movement inside a cylinder 312, which results in an intense friction at the interface 314 between the piston and the cylinder. When the typical lubricant is used, surface damage appears at the interface 314, as illustrated in FIG. 3B, while the use of a lubricant mixed with the novel multifunctional co(ter)polymer 216 (i.e., blend 320) minimizes the damage, as illustrated in FIG. 3C. FIG. 3D shows the blend 320 including the lubricant 322 and the multifunctional co(ter)polymer 216 being present at the interface 314 while FIG. 3D shows the co(ter)polymer 216 with the various monomers $M_1$ to $M_3$, that are capable to achieve the desired characteristics. Note that each monomer is selected to achieve at least one functionality of the additive, based on the method discussed above.

Two samples of lubricating oils blended with 2.5 to 5.0 wt % polyepoxide-based co- or terpolymers formed as discussed above were investigated. Their rheological properties were determined using a rheological meter, as per ASTM D7042 standard. Thermal stabilities of the prepared lubricating oils were evaluated using a simultaneous thermal analyzer. The oil lubrication performances and their boundary film formation capabilities were studied in a tribological test rig coupled with an ECR sensor. A low sliding speed (50 mm/s) was applied to resemble the oil lubrication at boundary (and mixed) lubrication regime. Load-bearing capacities of formulated oils were varied with test loads from 50 to 500 N (corresponding to 1.7 to 3.7 GPa), while their thermal sensitivities were studied by changing the test surface temperatures from 25 to 200° C. The frictional species generated on wear tracks were investigated using Raman spectroscopy.

The polyepoxide co- or terpolymers made as discussed next, were investigated for three parameters, which are required by effective lubricant formulations, i.e., (a) thermal stabilities, (b) rheological properties, and (c) boundary lubrication performances (anti-friction/wear properties). As discussed above, the lubricant additives made by the inventors employed ROP of epoxides with different monomers, i.e., HO or OO or LGE, or EHGE as the first type of monomer with PO as the second monomer. In addition, a triblock terpolymer of OO, PO, and SO was synthesized following the same method. Based on the study of these lubricant additives, it was observed that the first monomer $M_1$, which includes aliphatic chains, simultaneously improves/increases the solubility of the additive into the lubricant, and the friction/wear reduction capabilities of the additive/lubricant. Two lipophilic homopolymers, including poly(hexene oxide) (PHO) and poly(octene oxide) (POO), were used during the tests to serve as the benchmarks. The second monomer $M_2$ of the novel lubrication additives is designed to promote condensed polymeric film formations that reduce metallic contacts of rubbing surfaces. The PO is sequentially block copolymerized with one of HO and OO and LGE and EHGE to respectively achieve poly(hexene oxide-block-propylene oxide) (PHO-b-PPO) and/or poly(octene oxide-block-propylene oxide) (POO-b-PPO), and/or poly(lauryl glycidyl ether-b-poly(propylene oxide), PLGE-b-PPO, and/ or poly(2-ethylhexyl glycidyl ether)-b-(poly(propylene oxide), PEHGE-b-PPO. The third monomer $M_3$, e.g., SO, is further copolymerized from a living POO-b-PPO chain end to produce POO-b-PPO-b-PSO (the same method may be used to generate PHO-b-PPO-b-PSO), such that oil thermal stabilities of the lubricant can be maximized. In one application, ROP of low-molecular-weight polyepoxide co- or terpolymers was targeted as the lubricant additives obtained under these conditions achieve stronger resistivity to mechanical cleavage (i.e., greater shear stabilities). Note that the SO monomer can be added to any of the other block copolymers listed above.

Polyepoxide co(ter)polymers with multiple blocks entail complex intramolecular and intermolecular interactions. To determine or characterize these interactions, the inventors have applied electrical contact resistance (ECR) measurements to track the metallic contact evolutions on oil-lubricating surfaces. The ECR measurements have successfully assessed the boundary film formation capabilities of the lubricating oils as formulated with various additives, such as functionalized polymers, ionic liquids, nanoparticles, ZDDPs, and organic friction modifiers. On oil-lubricating surfaces, measured ECR curvatures, which estimate the number of metallic contacts, can be translated as the effectiveness of boundary film formations on sliding surfaces with different lubricant additives. The resolved kinetic features of boundary film formations on sliding surfaces can be further linked with lubrication performances, i.e., friction and wear, and utilized to interpret associated interfacial interactions resulted from blended additives.

The synthetized additives 216 were blended with a lubricant, e.g., group II base oil (AramcoPrima grade 230 oil, AP230) by 2.5 and 5.0 wt %, respectively. The weight percentage of the additives blended with the lubricant can be in the range of 1 to 10 wt %. All co(ter)polymers 216 showed excellent solubility. Nevertheless, before testing, all prepared lubricant formulations were sonicated in a room-temperature water bath for 30 seconds. The rheological properties of the prepared lubricant blend 320 containing polyepoxides were determined as per ASTM D7042 standard. The kinematic viscosities of each lubricant at 40° C. and 100° C. were measured with viscosity indices calculated as per methods specified in ASTM D2270/ISO2909. The thermal stabilities of the prepared lubricant were investigated using a thermogravimetric analyzer (TGA). The TGA was performed under continuous 20 sccm (i.e., standard cubic centimeters per minute) nitrogen purge at a heating rate 10° C./min from room temperatures to 500° C. in a simultaneous thermal analyzer (STA). Thermogravimetric and differential thermogravimetric mass loss profiles of AP230 base oil, polyepoxides, and respective lubricant blends (2.5 and 5.0 wt %) were acquired.

The tribological properties of each lubricant formulation were studied in a standardized tribological test rig. About 50 μL lubricating oils were placed in a ball-on-disk configuration. Their boundary lubrication performances were evaluated under controlled load at 50 N, temperature of 50° C., sliding speed of 50 mm/s (corresponding to 1 mm, 25 Hz stroke) for 30-minute linear reciprocations. The load-bearing capacities of the formulated lubricants were studied from 50N to 500N while the temperature and sliding speed were kept at 50° C. and 50 mm/s, respectively; each step was held for five minutes and increased to another load level without stopping. The temperature sensitivity was studied from 50° C. to 200° C. Each temperature step was held for five minutes. The applied load and sliding speed were controlled at 50 N and 50 mm/s, respectively. All tribological test results with polyepoxide-blended oils showed good repeatability.

The boundary film growths were studied first. The electrical contact resistance sensor was installed on the tribological test rig. The sensor was equipped with an adjustable current (from ±1 pA to ±250 mA). The kinetics of the boundary film growths (or the number of metallic contacts) was evaluated by in-situ measured electrical resistance (R) on sliding surfaces:

$$R = \frac{V}{I} \quad (1)$$

where V is the electrical potential, and I is the current flowed between the ball and disk.

Before all surface analysis, all contacted pairs were gently rinsed with petroleum ether and subsequently dried under vacuum overnight. The lubricant wear-resistive performances were evaluated with ball wear volumes ($V_{Ball}$), which are calculated using the following equations:

$$V_{ball} = \frac{\pi h}{6}\left(\frac{3d^2}{4} + h^2\right), \quad (2)$$

and $$h = r - \sqrt{r^2 - \frac{d^2}{4}}, \quad (3)$$

where d is the wear scar diameter, r is the ball radius, N is the normal load, and S is the sliding distance. Wear scar diameters of rubbed balls were measured using an optical microscope.

The chemical composition profiles of the produced wear tracks (rubbed disks) were analyzed using Raman Spectroscopy. A Cobalt-source visible light (473 nm) with a proper light intensity (20 mW) was utilized to induce associated Raman spectra. The spectra were collected from 200 cm$^{-1}$ to 3000 cm$^{-1}$ with 1800 cm$^{-1}$ grating, 5-s integration, and 3 accumulations. Three to five random spots were measured to indicate steady-state chemical composition profiles generated from different oil-lubricated surfaces.

The molecular weights of the synthesized polyepoxides additives 216 were determined using an NMR spectroscopy and a gel-permeation chromatography (GPC) method, and they are listed in Table 1 in FIG. 4. Analyzing the NMR spectra confirmed the successful synthesis of each targeted polyepoxide co- or terpolymers of Table 1. All GPC traces of homo- and copolymers exhibited narrow distribution, indicating well-controlled co- or terpolymerizations catalyzed by t-BuP$_2$/TEB. The DSC analysis revealed that all co(ter)polymers have low $T_g$, below 0° C. The low $T_g$ of all co(ter)polymers resulted from the flexible C—O bonds along the polyepoxides backbones and the high mobility of the alkyl side chains. Overall, the synthesized polyepoxides of Table 1 had low molecular weights with a range from about 10 to 22 kg/mol, narrow polydispersity, and residue-free. The well-defined polyepoxide co(ter)polymers 216 allowed to perform the following analysis, to understand their exact behaviors as lubricating oil additives, and to discuss their underlying lubrication mechanisms. Note that the ratios of the various monomers $M_1$ to $M_3$, catalysts t-BuP$_2$ and TEB, and initiator I, may vary within a +/−20% range. In one application, for the POO-b-PPO-b-PSO polyepoxide terpolymer, a partial ratio of OO to PO to SO is 100:120:35 when formed with the organocatalytic ROP process and a full ratio of the OO:PO:SO:I:P2:TEB is 100:120:35:1:0.6:0.3. However, the partial ratio may also be (100):(50-200):(25-100), and the full ratio may be (100):(50-200):(25-100):1:(0.6+/−0.12):(0.3+/−0.06).

Table 2 in FIG. 5 shows the enhanced viscosity index for the novel polyepoxides additives 216 at low treating rates (from 2.5 to 5.0 wt %). Polyepoxides with longer alkyl chains, i.e., POO and POO-b-PPO, generally produced better viscosity modifications on the AP230 oil. Blending 2.5 to 5.0 wt % POO improved the viscosity index (VI) from about 100 to 160 while adding PHO increased the VI to about 120. Notably, the PPO-derived co(ter)polymers, although with 50% higher molecular weights, showed similar viscosity indices improvements when compared to respective homopolymers, i.e., POO. This behavior is attributed to unproportioned thicken powers of the POO-b-PPO at different temperatures, i.e., good oil-thickening power at lower temperatures while poor oil thickening at higher temperatures. This phenomenon can be understood by thermal-induced molecular coil swelling with different size of alkyl pendant groups. A longer alkyl chain, e.g., POO, entailed more molecular coil entanglement with dispersion fluids (AP230 oil), which produces strong oil thickening powers at low and high temperatures. Meanwhile, a shorter alkyl chain, which yields stronger intramolecular hydrogen bonding, inhibited molecular coil expansions and reduced molecular coil entanglement with hydrocarbon-constituted base oil at a higher temperature. Therefore, POO-b-PPO-blended oils showed limited improvements on the viscosity index upon the copolymerization with the PPO block.

Notably, an additional PSO block to POO-b-PPO showed strong antagonisms to oil rheological behaviors. The POO-b-PPO-b-PSO terpolymer reduced the viscosity index down to 90, which was not expected, particularly because of their relatively small portions (ca. 20 wt %). This rheological behavior is attributed to their oil thickening powers that were effective only at lower temperatures. At lower temperatures, the π-π interactions were mainly intramolecular, while the interactions extended to intra- and inter-molecular forces at high temperatures. Such behaviors limited their thermal-induced coil expansions that create entanglement with base fluids and thereby, reduce the viscosity indices of POO-b-PPO-b-PSO-formulated oils. This finding corresponded to the rheological properties of lubricating oils containing styrene-derived copolymers. Strong oil thickening powers were demonstrated only at low temperatures, showing disadvantages in common IC engine applications, e.g., difficult cold-starting, high shear forces, and poor fuel economy.

It is worth noting that the polyepoxides utilized in these embodiments had low molecular weights, ranging from about 10 to 20 kg/mol, as illustrated in both Tables 1 and 2 in FIGS. 4 and 5, respectively. The low molecular weights of the polyepoxides 216 are one reason for resisting high-shear stress for applications in extreme environments, while their viscosity modification powers are usually less efficient. Yet, the inventors observed that even with low-molecular weights polyepoxide copolymers, they produced similar thickening powers to high-molecular-weight poly(alkyl methacrylates) ranging from 100 kg/mol to 300 kg/mol. The viscosity index improvements with polyepoxide copolymers required only 2 to 5 wt %, which was much lower than the viscosity modifications with low-molecular-weight poly(alkyl methacrylates) (up to 12.5 wt %). Nevertheless, the polymer architectures also played a role in their oil thickening powers.

The thermal stability of the AP230 oil, homo- and block-polyepoxides 216, and oils containing 2.5 and 5.0 wt % additives (i.e., blend 320) was also investigated, as illustrated in Table 3 in FIG. 6. This table provides temperatures recorded at 5% and 50% mass loss of the prepared lubricant samples noted above. The temperatures corresponding to a particular mass loss were higher for lubricants with polymer blends than the pristine base oil (AP230). For instance, temperatures at a maximum rate of mass loss ($T_{max}$) in differential mass loss profiles were shifted to higher regimes. This shift can be attributed to the thermal stability imparted by the blended polyepoxide co(ter)polymers 216. The $T_{max}$ for AP230 was found to be at about 325° C., while when being blended with polyepoxide co(ter)polymers, it shifted to higher regimes (about 400° C.). Notably, oils blended with POO-b-PPO-b-PSO produced the highest $T_{max}$ (about 405° C.), which confirms the synthesis strategy of FIG. 1, and utilizing SO as radical scavengers that enhance thermal stabilities of the lubricating oils.

Interactions between the oils and the blended polyepoxide co(ter)polymers were analyzed based on the following equations:

$$T_{dx\ \%}{}^* = (T_{dx\ \%\ base\text{-}oil}(1-\text{blending fraction}) + T_{dx\ \%\ polymer}(\text{blending fraction})), \text{ and} \quad (3)$$

$$\Delta T = T_{dx\ \%} - T_{dx\ \%}{}^*, \quad (4)$$

where $T_{dx\ \%}$ represents experimental temperatures at x % of a mass loss, and blending fractions (of polyepoxides) ranged from 2.5 and 5.0 wt %, as shown in Table 3 in FIG. 6. $T_{dx\ \%}{}^*$ was denoted as the ideal temperatures produced by mixing polymers and oils. $\Delta T_x$ were recorded as the difference between $T_{dx\ \%}$ and $T_{dx\ \%}{}^*$ at x % of a mass loss, which quantifies the interaction between the base oil and polymer.

Table 4 in FIG. 7 shows the synergisms between oils and polyepoxide co(ter)polymers 216. The calculated $\Delta T_{5\%}$ and $\Delta T_{50\%}$ for all formulated lubricants were positive and greater than 50° C. Increasing the polyepoxide co(ter)polymer blending concentration further raised the $\Delta T_{5\%}$ and $\Delta T_{50\%}$ by about 5° C., resulting in thermal stabilities being enhanced. Notably, the largest $\Delta T_{5\%}$ and $\Delta T_{50\%}$ were lubricants blended with PPO-constituted co(ter)polymers, indicating the enhanced thermal stability synergism with PO block and further intensified with the SO block.

Oil lubrication performance of the oils and oils blended with the polyepoxide co(ter)polymers 216 were also investigated, as illustrated in Table 5 in FIG. 8. Table 5 shows improved boundary lubrication performances with different polyepoxide co(ter)polymers 216. Blending PHO and POO to oils reduced frictions by about 10 to 25% and ball wear volumes by about 15 to 50%. Utilizing diblock copolymers 216, PHO-b-PPO and POO-b-PPO, respectively, dropped the friction and wear by about 40 and 85%, a significant improvement when compared with the PHO and POO polymers. The terpolymer, i.e., POO-b-PPO-b-PSO, also showed improved oil lubrication performances relative to the simple polymers, with friction and wear reductions by about 35 and 75%. The enhanced lubrication performances can be attributed to the boundary film formations with polyepoxides co(ter)polymers 216 on the sliding surfaces. Nonetheless, increasing the blending concentrations from 2.5 to 5.0 wt %, also shown in Table 5, brought insignificant changes, which can be attributed to the saturated interactions between the blended polymers and sliding surfaces, e.g., full surface coverage by polymeric boundary films.

Table 5 also demonstrates an inverse relationship between the average ECRs and the boundary lubrication performances, i.e., friction and wear volumes. For instance, surfaces lubricated by AP230 oils produced the lowest average ECRs (about 20 mΩ) and the worst lubrication performance, e.g., largest friction and wear. Blending polyepoxide homopolymers to the AP230 oil raised the average ECRs to about 90 mΩ. Utilizing polyepoxide co(ter)polymers 216 further increased the average ECRs to hundreds of mΩ. The increased average ECRs indicates more electrically insulating materials produced on the sliding surfaces. The formation of these electrical insulating materials is responsible for the improved boundary lubrication. They are either surface-adsorbed polymers, thickened oil films, or frictional species that are commonly referred to as tribofilms. More specifically, the oil lubrication that has lesser metallic contacts produced friction and wear reductions in the boundary lubrication regime.

It is worth noting that the third block containing monomer $M_3$, e.g., PSO, slightly degraded the boundary lubrication performances. As compared to POO-b-PPO oil blends, the POO-b-PPO-b-PSO oil blends showed lesser friction and wear reductions. Additionally, their surfaces were measured at about 100 to 300 mΩ, indicating more metallic contacts than the POO-b-PPO oil blends.

Figure 9A:
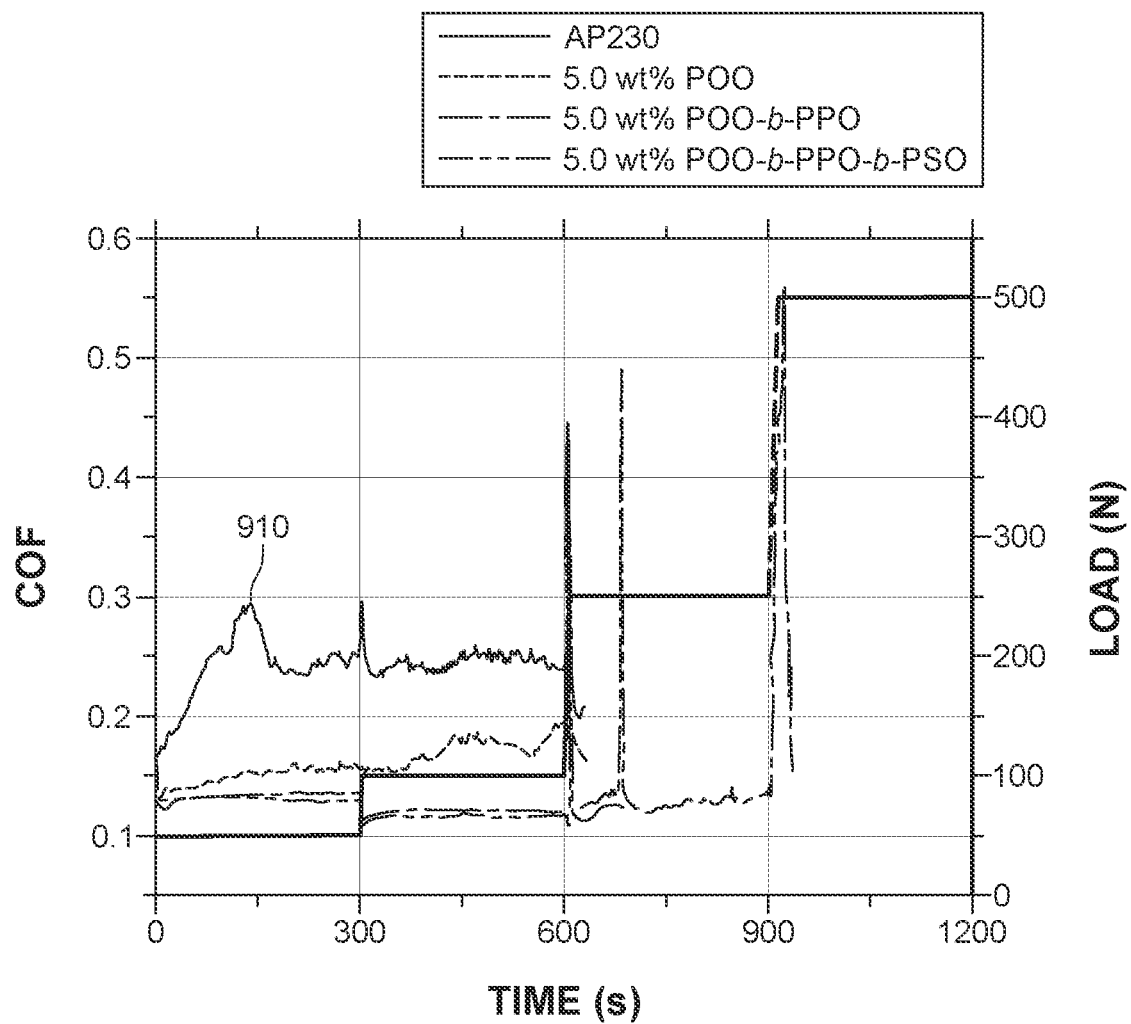
Figure 9B:
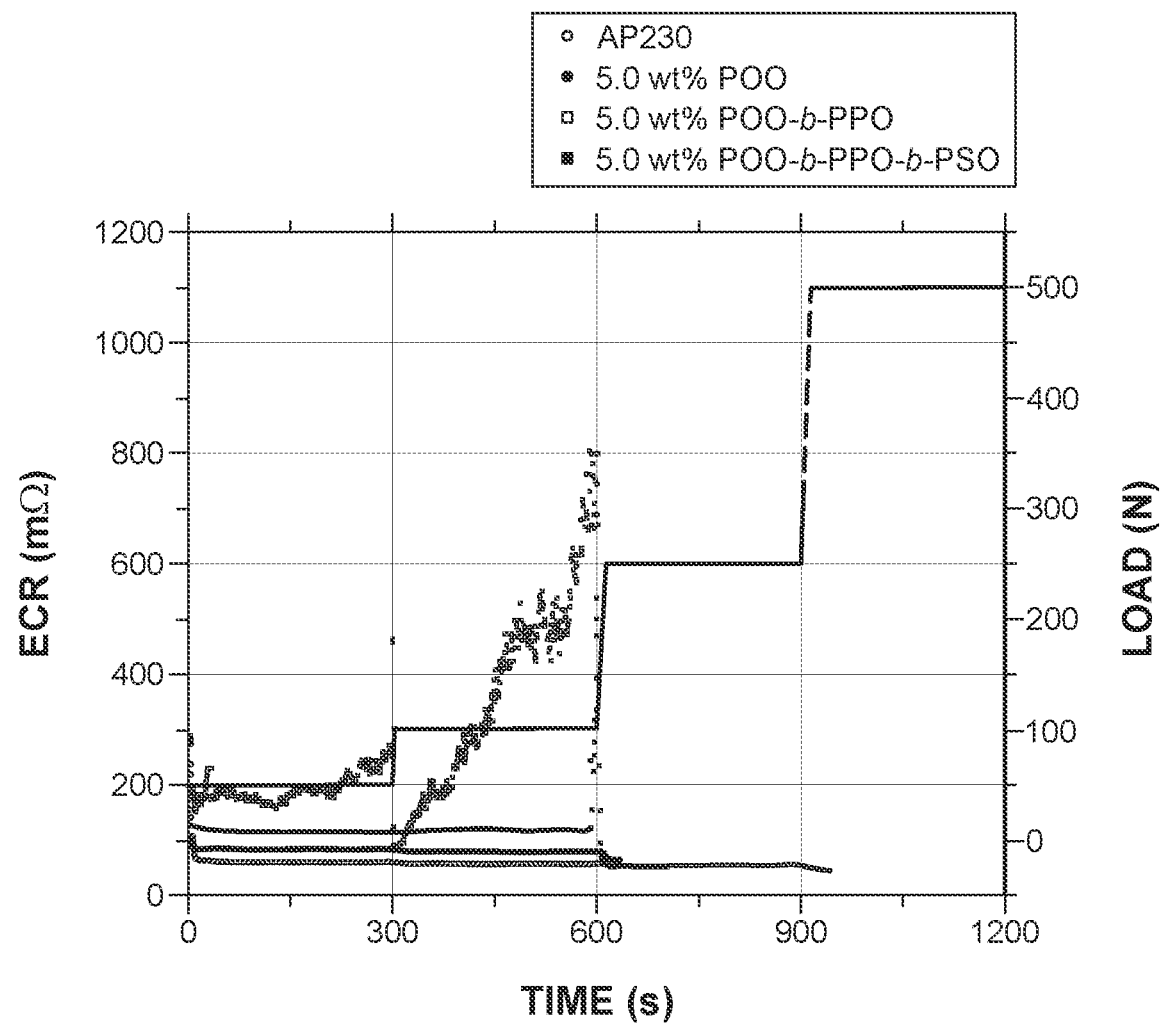

FIGS. 9A and 9B illustrate how the friction and ECR values for pure oil, oil with known additive, and oil with the novel additives 216 change for different test loads. Surfaces lubricated by the AP230 oil showed higher frictions at the start of linear motions. The zig-zag friction curve 910 in FIG. 9A can be attributed to frequent metallic contacts and inadequate oil lubrication at run-in periods. Increasing test loads produced sharp friction curve peaks on AP230 oil-lubricating surfaces, indicating that oil lubrication with only AP230 has insufficient load-bearing capacities. Meanwhile, the load-bearing capacity was increased from 50 to 100 N for POO and POO-b-PPO-b-PSO additives, and up to 200 N for the POO-b-PPO additive. As indicated by the measured ECRs in FIG. 9B, the enhanced load-bearing capabilities can be attributed to surface-adsorbed polyepoxides, thickened oil films, or frictional product formations. It is worth noting that the load increases reduced the ECRs for all oil-lubricated surfaces. One possible rationale can be the stress-assisted removal of electrical insulating materials on sliding surfaces. The other possible reason can be the plastic deformations of contact pairs at higher contact pressures, which increased the number of metallic contact areas and reduced ECR values. Nevertheless, the boundary film resistance to high-load-and-high-frequency linear reciprocations explained the mechanisms of load-bearing capacities of the lubricating oils.

Figure 10A:
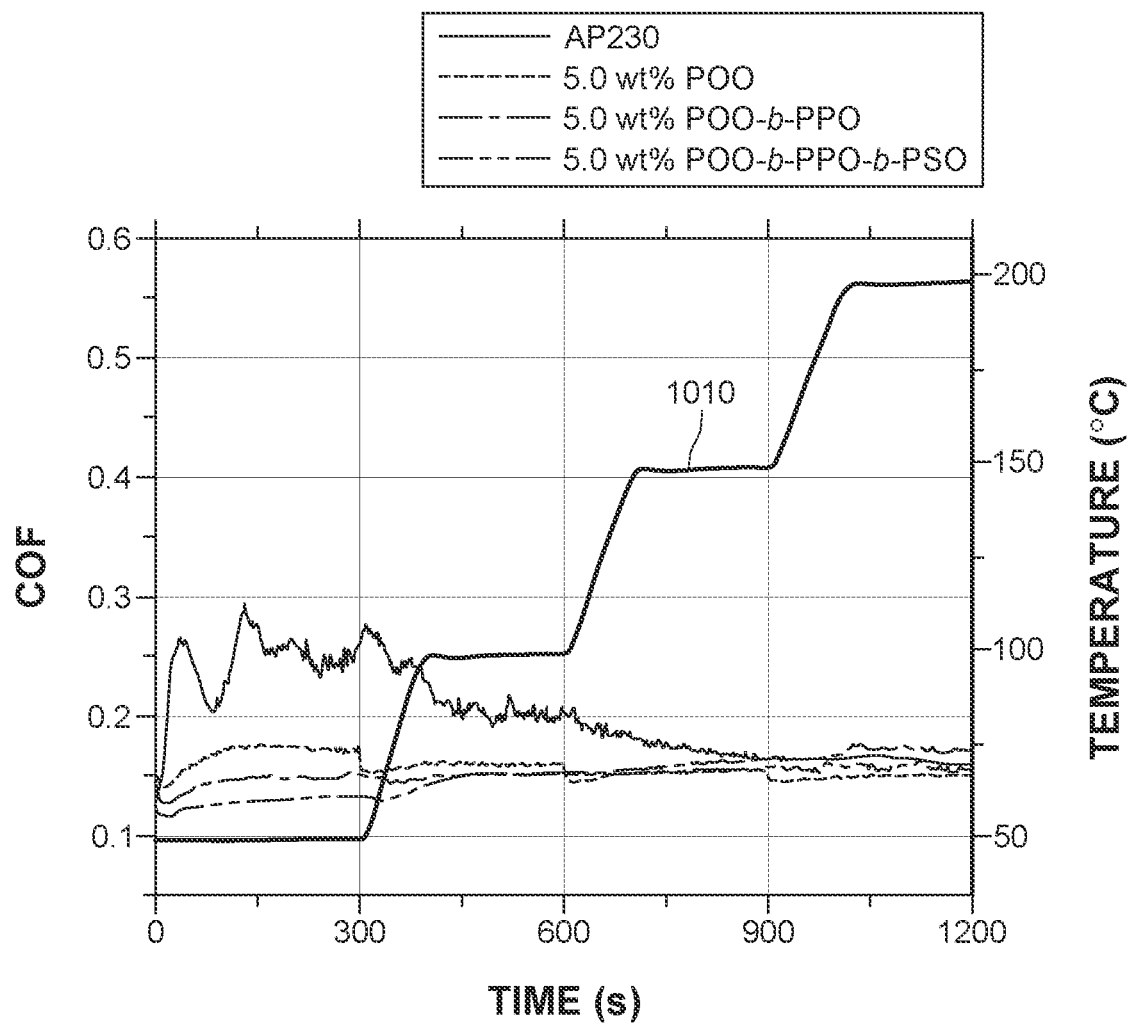
FIGS. 10A and 10B show the same quantities for a constant load of 50 N and a controlled increase surface temperature from 50 to 200° C.
Figure 10B:
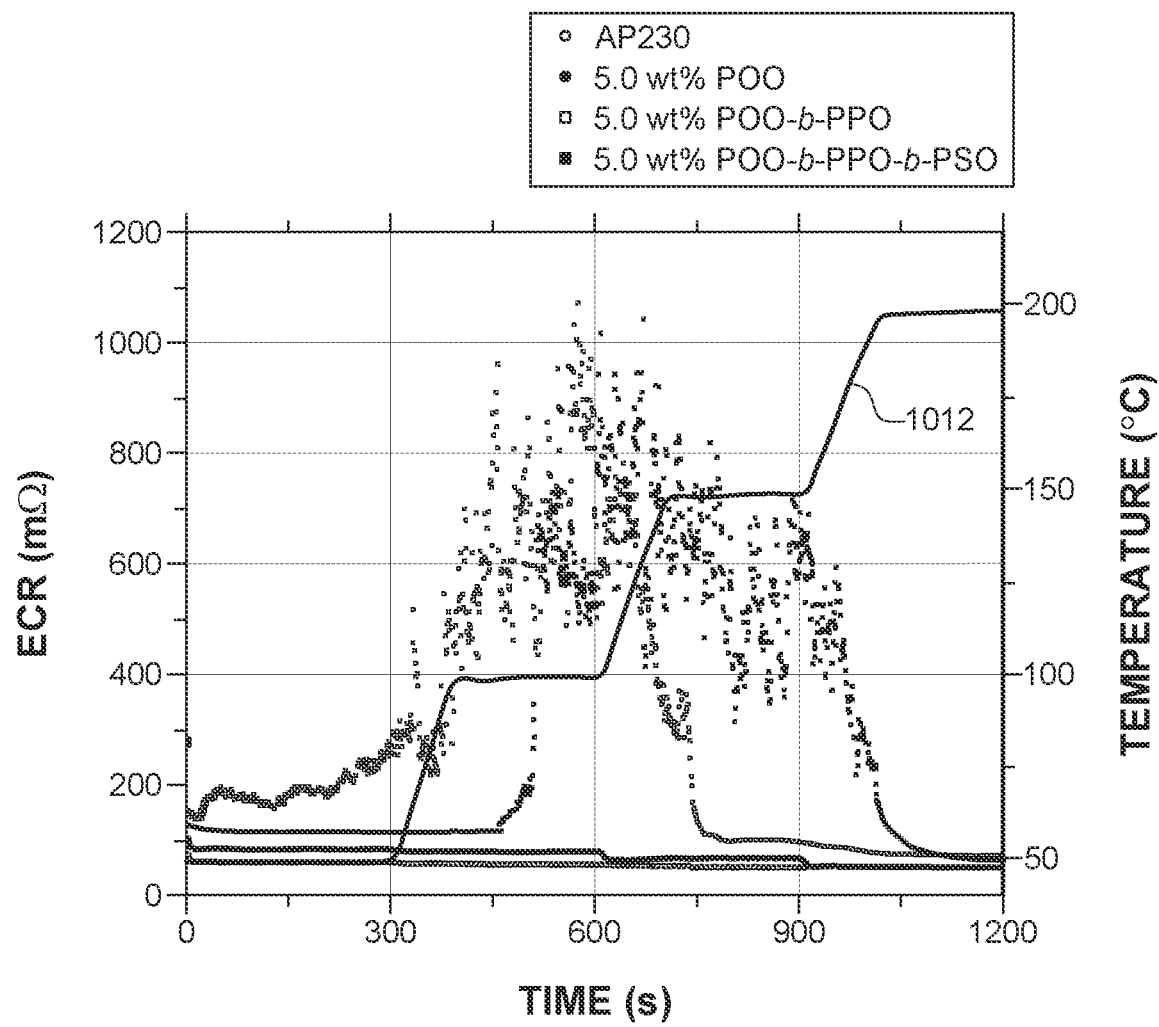

FIGS. 10A and 10B show the effect of temperature increases (see curves 1010 and 1012) on different oil-lubricated surfaces. As indicated by the measured ECRs, the amount of electrical insulating materials was negligible on the AP230 oil-lubricated surfaces at all temperatures. Surfaces lubricated with POO-b-PPO and POO-b-PPO-b-PSO additives produced higher ECRs, which effectively reduced the COFs at temperatures below 150° C. The measured COFs indicated that polyepoxide co(ter)polymers could ensure their boundary lubrication performances in IC engine-related applications. The other interesting feature with increasing the surface temperature was that for all oil-lubricated surfaces, their COFs and ECRs curvatures converted to about 0.15 and 100 mΩ, respectively. Possibly, higher surface temperatures, with high-frequency-and-high-load surface rubbing, shrank oil films and caused plastic deformation of the heated iron substrates. Continuous linear reciprocations removed oils, polished sliding surfaces, produced a similar number of metallic contacts, and eventually resulted in the same COFs and ECRs.

Images of the surface morphologies of rubbed surfaces when lubricated by different polyepoxide co(ter)polymer oil blends were obtained and they indicated that the rubbed surfaces were covered by dark, carbonaceous materials commonly produced by hydrocarbon-based lubricating oils. All rubbed surfaces were cleaned with petroleum ether, removing most oils, polymers, and degraded species. Therefore, the obtained Raman spectra indicated chemical species that strongly bind to surfaces. Multiple Raman spectra were sourced from selected regimes to show the chemical composition profiles that represent produced frictional species.

Figure 11A:
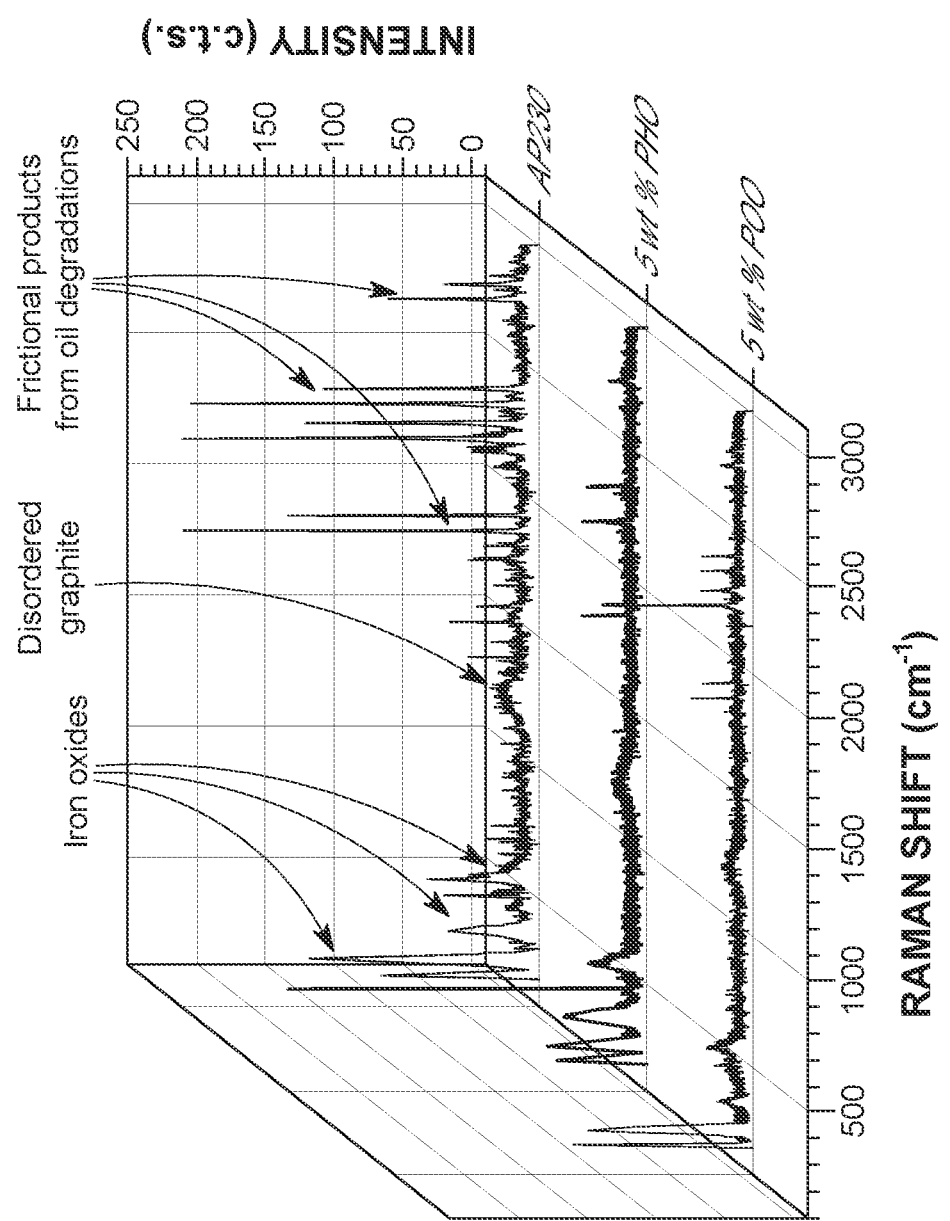
FIGS. 11A and 11B show Raman spectra comparisons of frictional products deposited on rubbed surfaces lubricated by different polyether-blended oils.
Figure 11B:
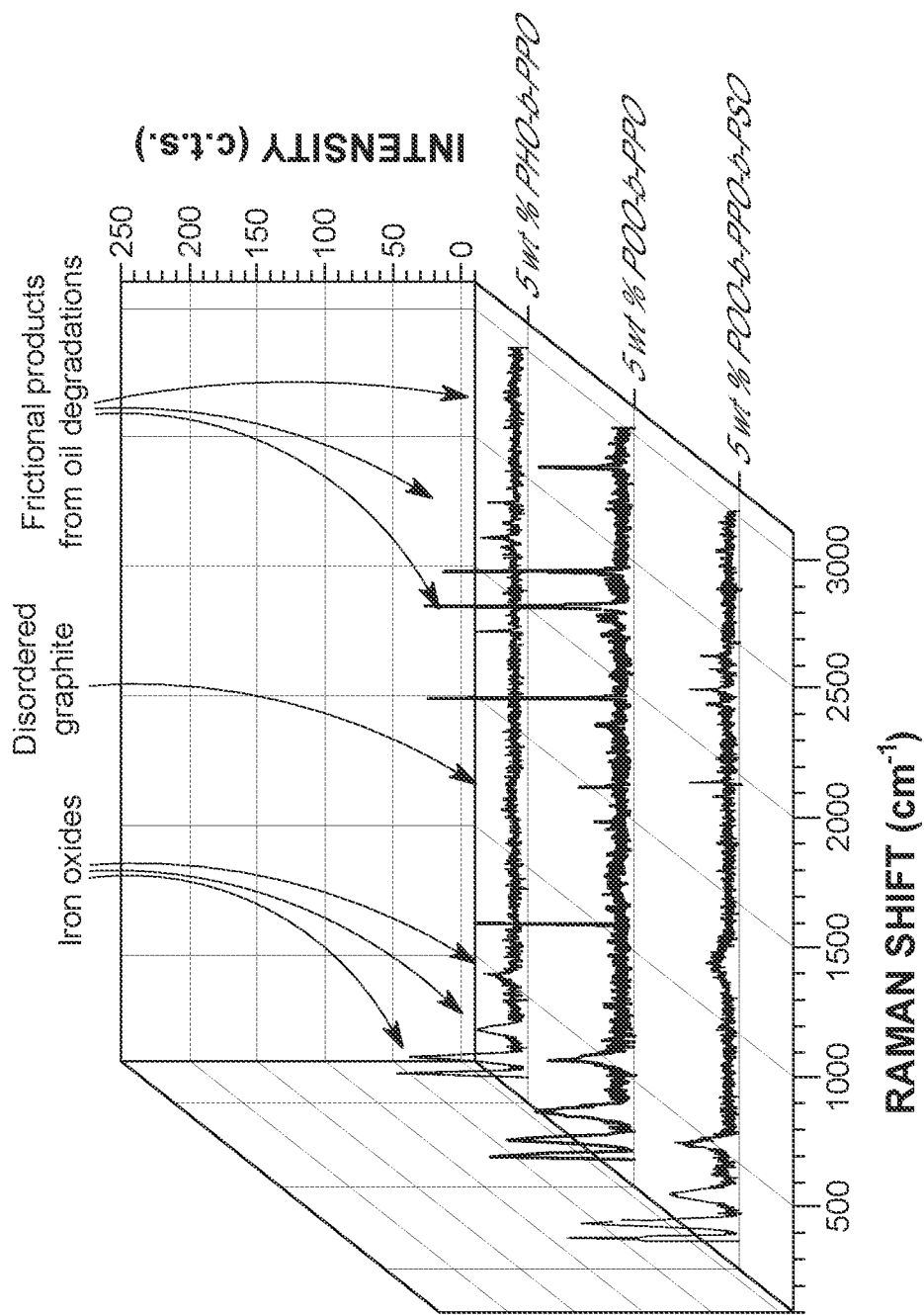

FIGS. 11A and 11B illustrate Raman spectra that indicate different chemical species produced on the rubbed surfaces. They include iron oxides, disordered graphite, and various frictional species from degraded lubricating oils. The first four peaks can be attributed to different iron oxides, including goethite ($\alpha$-FeOOH, at about 275, 475, and 580 $cm^{-1}$) and lepidocrocite ($\gamma$-FeOOH, at about 380 $cm^{-1}$).[44] They were driven by different mechanical energy distributions on rubbing surfaces. The surface asperities, where the activation energies were lowered by surface sliding, produced material wear or further interactions with penetrated oxygen molecules that form iron oxides. Rubbing hydrocarbons upon these surface asperities also triggered their degradations, adsorptions, and polymerizations, which are responsible for carbonaceous material formations. For instance, the broad spectra, with the center located at about 1350 $cm^{-1}$, can be attributed to disordered D-mode graphite, while the peak located at about 1580 $cm^{-1}$ can be assigned to G-mode graphite (in-plane vibration of carbon atoms). Meanwhile, multiple peaks can be attributed to various frictional species degraded from the AP230 oil, as shown in FIGS. 11A and 11B. Nevertheless, the inventors did not observe any special spectra featured by different polyepoxides co(ter)polymers oil blends as compared to surfaces lubricated by the AP230 oil. This indicates that the chemical species of deposited frictional products were similar on different lubricating oil-lubricated surfaces.

Analyzing the spectra ratios in FIGS. 11A and 11B showed that iron oxides were the dominant species on all rubbed surfaces, regardless of the types of formulated lubricating oils. Meanwhile, polyepoxide-blended oils reduced iron oxide formations, the G-mode graphite, and multiple frictional species featured by the degraded AP230 oil. This phenomenon is attributed to tribochemical reactions directed by the polyepoxide co(ter)polymer blended oils. The measured ECR curvatures support this consideration. Lesser metallic contacts were translated as reductions in mechanical energy on contacting surfaces as lubricated by polyepoxide co(ter)polymers. The mechanical energy, which was supposed to be consumed by the AP230 oil, was transferred to the surface-adsorbed polyepoxides, and thereby reduced the AP230 oil degradations as well as the generation of iron oxides on sliding surfaces. Polyepoxide co(ter)polymer oil blends produced spectra featured by CO—O—CO anhydride, indicating the deprivation of oxygen atoms on sliding surfaces; thereby, tribochemical reactions associated with oil degradation or surface oxidation were quenched by the reduced oxygen penetrations into oil films and rubbed surfaces.

All these tests indicate that surfaces lubricated by pure AP230 oil and different polyepoxide-blended oils showed similar spectra (see FIGS. 11A and 11B). Greater average ECRs were the consequence of polymeric boundary film buildups and responsible for friction and wear reductions, as illustrated in Table 4. Further, these tests suggest that enhanced boundary lubrication with polyepoxide co- or terpolymers oil blends were more dominant by the polymeric boundary film growth kinetics (see FIGS. 9A to 10B) than by the produced frictional species (see FIGS. 11A and 11B). This was because the produced frictional species showed little impact on the oil lubrication performances, even formulating different polyepoxide co- or terpolymers. Instead, different oil formulations affected the time to onset of ECR rises, entailing faster surface protections (see FIGS.

9A to 10B), more efficient boundary film formations, and enhanced boundary lubrication performances (see Table 4).

Thus, it is concluded that the polyepoxide co- or terpolymers introduced above behave differently when compared to the existing polymer-based additives, having one or more of the following molecular features:

The lipophilic block, i.e., PHO and POO, enables thermal-induced molecular coil expansions, which effectively thicken lubricating oil and increase viscosity indices.

The hydrophilic block, i.e., PPO, induces thicker and faster boundary film formations and improved boundary oil lubrication performances.

The benzyl containing block, i.e., PSO, improves oil thermal stabilities while pi-pi intra- and inter-molecular interactions degrade the polyepoxide viscosity indices and hinders boundary film formations.

Thus, by changing the alkyl chain lengths it is possible to effectively design rheological and boundary lubrication performances of polyepoxide co- or terpolymers. Utilizing aryl groups-constituted polyepoxide co- or terpolymers should be avoided as they degraded the viscosity modification powers of polymers. This is due to strong π-π intra- and inter-molecular interactions that inhibit molecular coil expansions and their entanglement with lubricating oils.

Figure 12:
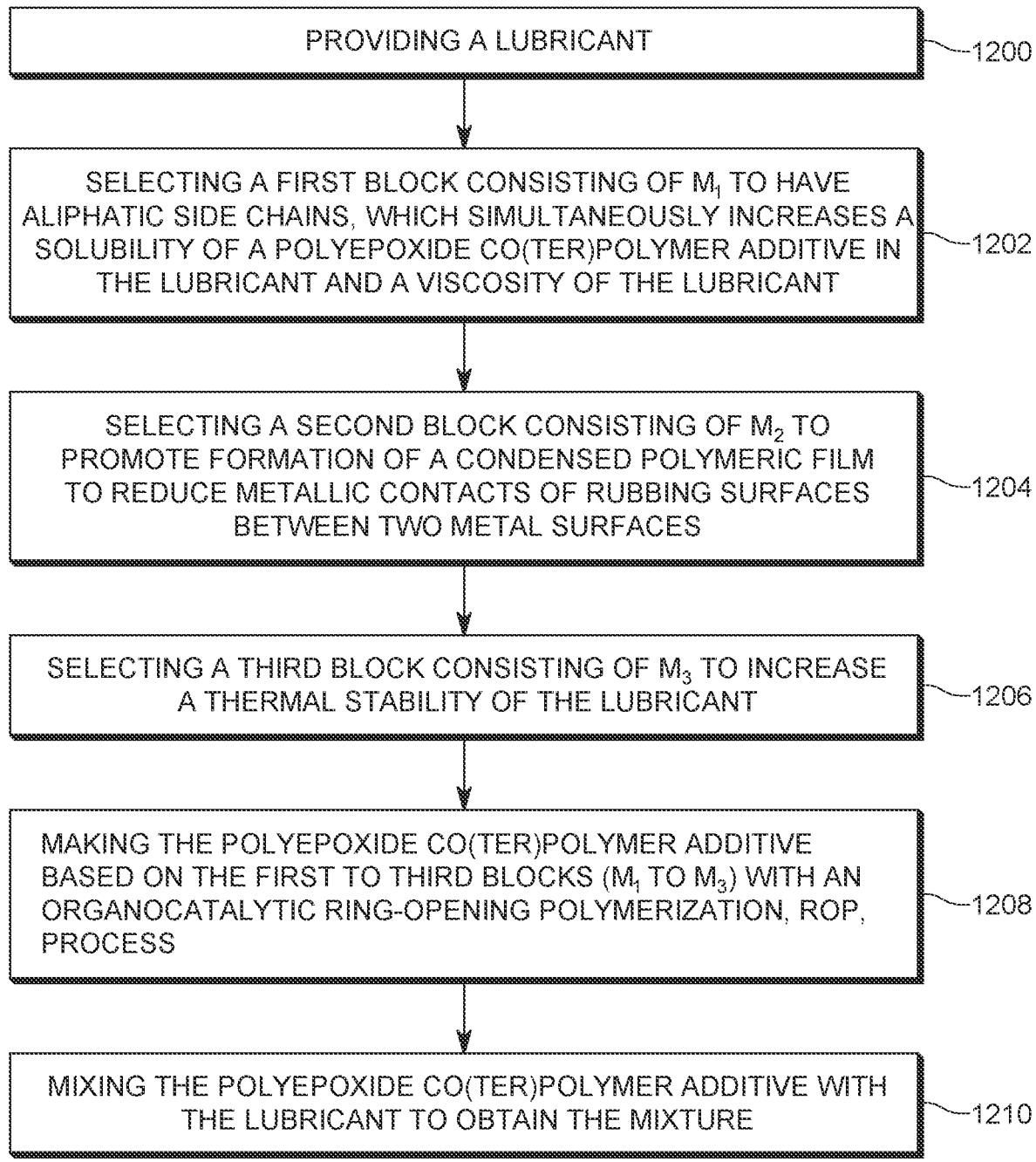
FIG. 12 is a flow chart of a method for selecting the components of the polyepoxide co- or terpolymer additive and making an additive oil blend.

A method for making a blend 320 for lubricating a surface is now discussed with regard to FIG. 12. The method includes a step 1200 of providing a lubricant, which may be a motor oil, a step 1202 of selecting a first monomer $M_1$ to have aliphatic side chains, which simultaneously increases a solubility of a polyepoxide co- or terpolymer additive in the lubricant and a viscosity of the lubricant, a step 1204 of selecting a second monomer $M_2$ to promote formation of a condensed polymeric film to reduce metallic contacts of rubbing surfaces between two metal surfaces, a step 1206 of selecting a third monomer $M_3$ to increase a thermal stability of the lubricant, a step 1208 of making the polyepoxide co- or terpolymer additive based on the first to third monomers ($M_1$ to $M_3$) with an organocatalytic ring-opening polymerization, ROP, process, and a step 1210 of mixing the polyepoxide co- or terpolymer additive with the lubricant to obtain the blend. The polyepoxide co- or terpolymer additive is 5% or less by mass and the lubricant is the remaining balance of the blend.

In one embodiment, a ratio of OO to PO to SO is (100+/−20):(120+/−24):(35+/−7) when formed. The organocatalytic ROP process uses triethyl borane, TEB, and phosphazene base, t-BuP$_2$, as catalysts, and an initiator I. A full ratio of the OO:PO:SO:I:P2:TEB is (100+/−20):(120+/−24):(35+/−7):1:(0.6+/−0.12):(0.3+/−0.06). The polyepoxide co- or terpolymer additive is block polymerized. The polyepoxide co- or terpolymer additive has a molecular weight within a range of about 10 to 22 kg/mol.

The disclosed embodiments provide a polymeric lubricant additive having different monomers, where each monomer is selected for achieving a desired property, e.g., thermal stability, friction reduction, oil solubility, viscosity improvement, etc. For example, to increase the viscosity and reduce the friction coefficient, POO-b-PPO and PHO-b-PPO are best suited for the lubricant formulations. On the other hand, POO-b-PPO-b-PSO gives better thermal stability, but the increase in viscosity and COF reduction are less than in the case of POO-b-PPO and PHO-b-PPO. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.
[1] Herzberger, J.; Niederer, K.; Pohlit, H.; Seiwert, J.; Worm, M.; Wurm, F. R.; Frey, H. Polymerization of Ethylene Oxide, Propylene Oxide, and Other Alkylene Oxides: Synthesis, Novel Polymer Architectures, and Bioconjugation. *Chemical Reviews*. American Chemical Society Dec. 29, 2016, pp 2170-2243. https://doi.org/10.1021/acs.chemrev.5b00441.
[2] Rudnick, L. R. *Synthetics, Mineral Oils, and Bio-Based Lubricants*; CRC Press, 2020. https://doi.org/10.1201/9781315158150.
[3] Greaves, M.; Zaugg-Hoozemans, E.; Khelidj, N.; van Voorst, R.; Meertens, R. Performance Properties of Oil-Soluble Synthetic Polyalkylene Glycols. *Lubr. Sci.* 2012, 24 (6), 251-262. https://doi.org/10.1002/ls.1179.
[4] Kiesewetter, M. K.; Shin, E. J.; Hedrick, J. L.; Waymouth, R. M. Organocatalysis: Opportunities and Challenges for Polymer Synthesis. *Macromolecules*. Mar. 9, 2010, pp 2093-2107. https://doi.org/10.1021/ma9025948.
[5] Qin, G.; Hu, X.; Cebe, P.; Kaplan, D. L. Mechanism of Resilin Elasticity. *Nat. Commun.* 2012 3 2012, 3 (1), 1003. https://doi.org/10.1038/ncomms2004.
[6] Hu, S.; Zhao, J.; Zhang, G.; Schlaad, H. Macromolecular Architectures through Organocatalysis. *Progress in Polymer Science*. Elsevier Ltd Nov. 1, 2017, pp 34-77. https://doi.org/10.1016/j.progpolymsci.2017.07.002.

What is claimed is:
1. A blend for lubricating a surface, the blend comprising:
a lubricant; and
a polyepoxide terpolymer additive mixed with the lubricant,
wherein the polyepoxide terpolymer additive includes a first block comprising group R1, a second block comprising group R2, and a third block comprising group R3, and
wherein the group R1 includes $C_4H_9$ or $C_6H_{13}$, the group R2 includes $CH_3$, and the group R3 includes $C_6H_5$.
2. The blend of claim 1, wherein the polyepoxide terpolymer additive is made from first to third monomers, the first monomer $M_1$ including hexene oxide, HO, or octene oxide, OO, the second monomer $M_2$ including propylene oxide, PO, and the third monomer $M_3$ including styrene oxide, SO.

3. The blend of claim 2, wherein a molecular weight ratio of OO to PO to SO is (100):(50-200):(25-100) when formed with an organocatalytic ring-opening polymerization, ROP.

4. The blend of claim 3, wherein the organocatalytic ROP uses triethyl borane, TEB, and a phosphazene base, t-BuP$_2$, as catalysts, and an initiator I, and a full molecular weight ratio of the OO:PO:SO:I:P2:TEB is (100):(50-200):(25-100):1:(0.6+/−0.12):(0.3+/−0.06).

5. The blend of claim 4, wherein the initiator I is eicosanol and the lubricant is motor oil.

6. The blend of claim 2, wherein the HO or OO of the first monomer $M_1$ is selected to have aliphatic side chains, which simultaneously increases a solubility of the polyepoxide co(ter) polymer additive in the lubricant and a viscosity of the lubricant.

7. The blend of claim 6, wherein the PO of the second monomer $M_2$ is selected to promote formation of a condensed polymeric film to reduce metallic contacts of rubbing surfaces between two metal surfaces.

8. The blend of claim 7, wherein the SO of the third monomer $M_3$ is selected to increase a thermal stability of the lubricant.

9. The blend of claim 1, wherein the polyepoxide terpolymer additive includes only three blocks.

10. The blend of claim 1, wherein the polyepoxide terpolymer additive has a molecular weight within a range of about 10 to 22 kg/mol.

11. The blend of claim 1, wherein the polyepoxide terpolymer additive is 5% or less by mass and the lubricant is the remaining balance.

12. A polyepoxide terpolymer additive for a lubricant, the polyepoxide terpolymer additive comprising:
a group R1 that includes $C_4H_9$ or $C_6H_{13}$ and is obtained from a first monomer $M_1$ that includes hexene oxide, HO, or octene oxide, OO, or lauryl glycidyl ether, LGE, or 2-ethylhexyl glycidyl ether, EHGE;
a group R2 that includes $CH_3$ and is obtained from a second monomer $M_2$ that includes propylene oxide, PO; and
a group R3 that includes $C_6H_5$ and is obtained from a third monomer $M_3$ that includes styrene oxide, SO.

13. The additive of claim 12, wherein a molecular weight ratio of OO to PO to SO is (100):(50-200):(25-100) when formed with an organocatalytic ring-opening polymerization, ROP.

14. The additive of claim 13, wherein the organocatalytic ROP uses triethyl borane, TEB, and a phosphazene base, t-BuP$_2$, as catalysts, and an initiator I, and a full molecular weight ratio of the OO:PO:SO:I:P2:TEB is (100):(50-200):(25-100):1:(0.6+/−0.12):(0.3+/−0.06) and the initiator I is eicosanol.

15. A method for making a blend for lubricating a surface, the method comprising:
providing a lubricant;
selecting a first monomer $M_1$ to have aliphatic side chains, which simultaneously increases a solubility of a polyepoxide terpolymer additive in the lubricant and a viscosity of the lubricant;
selecting a second monomer $M_2$ to promote formation of a condensed polymeric film to reduce metallic contacts of rubbing surfaces between two metal surfaces;
selecting a third monomer $M_3$ to increase a thermal stability of the lubricant;
making the polyepoxide terpolymer additive based on the first to third monomers ($M_1$ to $M_3$) by applying an organocatalytic ring-opening polymerization, ROP, process; and
mixing the polyepoxide terpolymer additive with the lubricant to obtain the blend,
wherein the polyepoxide terpolymer additive is 5% or less by mass and the lubricant is the remaining balance of the blend, and
wherein the terpolymer additive includes a first block, which includes a group R1 of $C_4H_9$ or $C_6H_{13}$, a second block, which includes a group R2 of $CH_3$, and a third block, which includes a group R3 of $C_6H_5$.

16. The method of claim 15, wherein a molecular weight ratio of OO to PO to SO is (100):(50-200):(25-100) when formed.

17. The method of claim 16, wherein the organocatalytic ROP process uses triethyl borane, TEB, and a phosphazene base, t-BuP$_2$, as catalysts, and eicosanol as an initiator I.

18. The method of claim 17, wherein a full molecular weight ratio of the OO:PO:SO:I:P2:TEB is (100):(50-200):(25-100):1:(0.6+/−0.12):(0.3+/−0.06).

19. The method of claim 15, wherein the polyepoxide terpolymer additive includes only first to third blocks.

20. The method of claim 15, wherein the polyepoxide terpolymer additive has a molecular weight within a range of about 10 to 22 kg/mol.

* * * * *